(12) United States Patent
Yamaguchi

(10) Patent No.: US 6,577,819 B2
(45) Date of Patent: Jun. 10, 2003

(54) CAMERA

(75) Inventor: Kunihisa Yamaguchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/046,393

(22) Filed: Jan. 16, 2002

(65) Prior Publication Data

US 2002/0094200 A1 Jul. 18, 2002

(30) Foreign Application Priority Data

Jan. 17, 2001 (JP) .................................. 2001-008848

(51) Int. Cl.$^7$ ............................. G03B 5/00; G03B 13/36
(52) U.S. Cl. ....................................... 396/55; 396/89
(58) Field of Search ................................ 396/55, 89

(56) References Cited

U.S. PATENT DOCUMENTS 5,237,363 A * 8/1993 Okada et al. .................. 396/55

FOREIGN PATENT DOCUMENTS

| JP | 11-243493 | 9/1999 |
|----|-----------|--------|
| JP | 11-275350 | 10/1999 |
| JP | 2000-19613 | 1/2000 |

* cited by examiner

Primary Examiner—W. B. Perkey
(74) Attorney, Agent, or Firm—Oblon, Spivak, McClelland, Maier & Neustadt, P.C.

(57) ABSTRACT

A camera with a blurring correction unit including, a displacement sensor 2 attached to the camera and capable of measuring a displacement of the camera, and driving mechanisms 12 and 22 capable of independently moving an optical component or a photographic member 8 including a lens in at least two directions, respectively, the driving mechanisms actuated in accordance with a detection signal of the displacement sensor 2, the camera capable of correcting a disturbance in a picked-up image due to blurring, wherein soft focus is attained by forcedly actuating the driving mechanisms 12 and 22 of the blurring correction unit.

48 Claims, 3 Drawing Sheets

CAMERA

FIELD OF THE INVENTION

The present invention relates to a camera capable of soft focus photographing using a camera hand correction unit and applicable to a digital camera, a silver salt film camera or the other various types of cameras.

BACKGROUND OF THE INVENTION

Varied techniques which give a soft focus effect to a picked-up image while picking up an image with a camera focused on a subject have been proposed and put to practical use. The invention described in Japanese Patent Application Laid-Open No. 2000-19613 is one of these techniques. According to this invention, a camera includes, a conversion lens arranged to be movable between an insertion position at which the conversion lens is inserted into a photographing optical system and a retreat position at which the conversion lens is retreated to the outside of the photographing optical system, and a photographing lens the focal distance of which differs between a state in which the conversion lens is inserted into the photographing optical system and a state in which the conversion lens is retreated to the outside of the photographing optical system. If a driving section drives and vibrates the conversion lens while the conversion lens is inserted into the photographing optical system and during photographing and exposure, a soft focus effect is given to a picked-up image.

There are also proposed techniques which give a soft focus effect to a picked-up image by mechanically, slightly vibrating an optical component of a varied type.

Further, techniques which give a soft focus effect while using an image processing technique in a digital camera have been proposed. The invention described in Japanese Patent Application Laid-Open No. 11-243493 is one of these techniques. According to this invention, a digital camera includes, a gain adjustment unit which adjusts the gain of at least one of an intermediate frequency component and a high frequency component of an original image signal, a unit which generates amount-of-focus image signal from an original image signal, and an addition unit which adds the image signal gain-adjusted by the gain adjustment unit and the out-of-focus image signal together. The digital camera generates a soft focus image signal from the digital original image.

The invention described in Japanese Patent Application Laid-Open No. 11-275350 is also one of these techniques which obtain a soft focus effect by applying an image processing technique. According to this invention, by setting a mode in advance while using a technique which suppresses a grain form if a film original is an under negative film or a highly sensitive negative film, an image processing for grain form suppression can be changed to a soft focus processing.

In case of obtaining a soft focus effect by mechanically, slightly vibrating an optical component as described in the Japanese Patent Application Laid-Open No. 2000-19613, it is necessary to provide a dedicated mechanism which obtains the soft focus effect and, in some cases, to add an optical component. As a result, the configuration of the digital camera is disadvantageously complicated and the cost thereof is disadvantageously pushed up.

Furthermore, in case of obtaining a soft focus effect by applying the image processing technique as described in the Japanese Patent Application Laid-Open No. 11-243493 or 11-275350, it is necessary to carry out an image processing operation and take time to carry out this operation. It is not, therefore, possible to easily, freely obtain a soft focus image. Besides, available cameras are normally limited to digital cameras.

SUMMARY OF THE INVENTION

The present invention has been achieved in order to solve the above conventional problems. It is an object of this invention to provide a camera capable of obtaining a soft focus image without providing a dedicated mechanism or optical component which obtains a soft focus effect and capable of obtaining the soft focus image without carrying out any complicated image processing.

According to a first aspect of the present invention, there is provided a camera capable of soft focus photographing with a blurring correction unit, the blurring correction unit comprising, a displacement sensor attached to the camera and capable of measuring a displacement of the camera, and driving mechanisms capable of independently moving an optical component or a photographic member including a lens in two directions, respectively, the driving mechanisms actuated according to a detection signal of the displacement sensor, the blurring correction unit capable of correcting a disturbance in a picked-up image due to blurring, wherein by forcedly actuating the driving mechanisms of the blurring correction unit by selection of a photographer, soft focus is attained.

A second aspect of the present invention provides the camera capable of soft focus photographing according to the first aspect, wherein the driving mechanisms allow the optical component or the photographic member to make a circular motion by independently moving the optical component or the photographic member in the two orthogonal directions, respectively, in accordance with driving waves each in a form of one of a sine wave and a cosine wave while a shutter is opened.

A third aspect of the present invention provides the camera capable of soft focus photographing according to the first aspect, wherein the driving mechanisms independently move the optical component or the photographic member in two orthogonal directions, respectively, according to driving waves each in a form of one of a sine wave and a cosine wave while a shutter is opened, the driving waves in the two directions are alternately changing periodic waves, and the driving mechanisms move the optical component or the photographic member by the periodic waves, respectively.

A fourth aspect of the present invention provides the camera capable of soft focus photographing according to the second or third aspect, wherein while the shutter is opened, each of the driving mechanisms has a combination of an operation state and an inoperative state.

A fifth aspect of the present invention provides the camera capable of soft focus photographing according to the second aspect, wherein each of the driving waves has a frequency of a natural number having at least one cycle.

A sixth aspect of the present invention provides the camera capable of soft focus photographing according to the second aspect, wherein amplitudes of the driving waves are adjustable.

A seventh aspect of the present invention provides the camera capable of soft focus photographing according to the fourth aspect, wherein operative time and inoperative time of each of the driving mechanisms while the shutter is opened are adjustable.

An eighth aspect of the present invention provides the camera capable of soft focus photographing according to the sixth or seventh aspect, wherein amplitude levels of the driving waves or operation time levels and inoperative time levels of the driving mechanisms are set in interlock with operation of an operation member provided at the camera, to thereby allow the photographer to select a soft focus level.

A ninth aspect of the present invention provides the camera capable of soft focus photographing according to the sixth or seventh aspect, wherein amplitude levels of the driving waves or operation time levels and inoperative time levels of the driving mechanisms are set in interlock with a change in a focal length of a photographic lens.

A tenth aspect of the present invention provides the camera capable of soft focus photographing according to the sixth or seventh aspect, wherein amplitude levels of the driving waves or operation time levels and inoperative time levels of the driving mechanisms are set in interlock with a change in a photographic distance.

An eleventh aspect of the present invention provides the camera capable of soft focus photographing according to the sixth or seventh aspect, wherein amplitude levels of the driving waves or operation time levels and inoperative time levels of the driving mechanisms are set in interlock with a change in aperture of a diaphragm of a photographic lens.

A twelfth aspect of the present invention provides the camera capable of soft focus photographing according to the sixth or seventh aspect, wherein amplitude levels of the driving waves or operation time levels and inoperative time levels of the driving mechanisms are set in interlock with an automatic exposure control state.

A thirteen aspect of the present invention provides the camera capable of soft focus photographing according to the first aspect, wherein blurring prevention photographing conducted by operation of the blurring correction unit and soft focus photographing conducted by forcedly actuating the blurring correction unit can be combined.

A fourteenth aspect of the present invention provides the camera capable of soft focus photographing according to the first aspect, comprising, a selection unit capable of selecting one of normal photographing with the blurring correction unit set in an inoperative state, blurring correction photographing with the blurring correction unit set in an operative state, soft focus photographing by forcedly operating the driving mechanisms of the blurring correction unit and blurring correction-added soft focus photographing.

Other objects and features of this invention will become understood from the following description with reference to the accompanying drawings.

DETAILED DESCRIPTION

The embodiments of a camera capable of soft focus photographing will be explained hereinafter with reference to the drawings.

Figure 1:
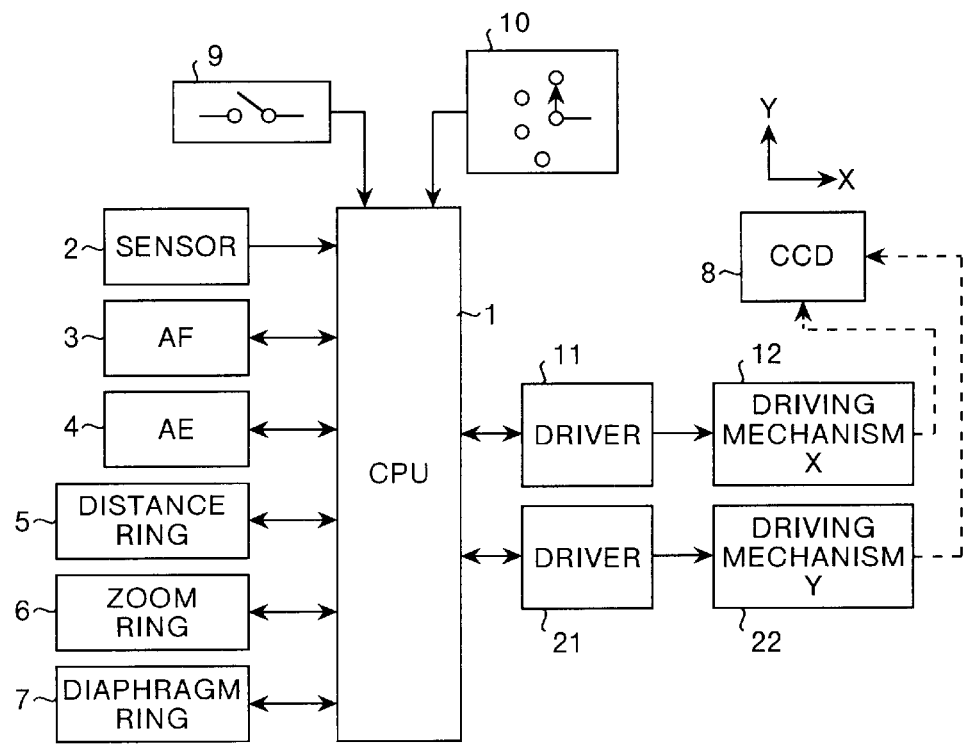
FIG. 1 is a block diagram which shows an example of a control system employed in a camera capable of soft focus photographing according to the present invention.

First, an example of a control system in the camera will be explained with reference to FIG. 1. In FIG. 1, a CPU 1 which controls the operation of respective sections based on signals input from the respective portions of the camera is provided in the camera. A displacement sensor 2, an automatic focus detection unit 3, and an automatic exposure unit 4 are connected to the CPU 1. Distance information is input into the CPU 1 from a distance ring 5 which is actuated in interlock with a change in a photographic distance. Focal distance information is input into the CPU 1 from a zoom ring 6 which is actuated in interlock with a change in the focal distance of a photographic lens. Diaphragm information is input into the CPU 1 from a diaphragm ring 7 which is actuated in interlock with a change in the diaphragm opening value of the photographic lens.

The displacement sensor 2, which is attached to the camera, is capable of detecting the displacement of the camera and measuring a displacement quantity. The detection output of the displacement sensor 2 is input into the CPU 1. The displacement sensor 2 comprises a speed sensor, or an acceleration sensor or the like. The automatic focus detection unit 3 measures the distance of a subject by an appropriate method and detects a focal position. The detection signal of the automatic focus detection unit 3 is input into the CPU 1. The CPU 1 controls the position of the distance ring 5 in accordance with the detection signal and focuses on the subject. The automatic exposure unit 4 detects the brightness of the subject and measures the luminance of the subject. The luminance signal obtained is input into the CPU 1 and the CPU 1 controls the diaphragm ring 7 so as to obtain appropriate exposure in accordance with this luminance signal.

The camera having the control system shown in FIG. 1 is an example of a digital camera. A CCD (charge coupled device) 8 is used as the image pickup member of the digital camera. The CCD 8 constitutes an area sensor. In case of an ordinary camera, the CCD 8 is fixed to the camera. In case of the camera in this embodiment, however, since a blurring correction unit capable of correcting a disturbance in a picked-up image due to blurring is provided, the CCD 8 is designed to be able to be independently moved in two directions by two driving mechanisms 12 and 22. Each of the driving mechanisms 12 and 22 is provided with, as a driving source, an appropriate actuator such as a plunger or a piezoelectric device. The moving quantity of the CCD 8 is changed in accordance with a voltage applied to the actuator.

The two directions in which the CCD 8 can be independently moved are X and Y directions parallel to the image pickup surface of the CCD 8 and orthogonal to each other in the example shown in FIG. 1. The driving mechanism 12 is driven by a driver 11 controlled by the CPU 1, while the driving mechanism 22 is driven by a driver 21 controlled by the CPU 1.

A shutter switch 9 which is actuated in interlock with a shutter button and a photographic mode switch 10 are connected to the CPU 1. The photographic mode switch 10 serves as a selection unit which a photographer can appropriately select and set. The photographer can select one of a normal photographing mode with the blurring correction unit set in an inoperative state, a blurring correction photographing mode with the blurring correction unit set in an operative state, a soft focus photographing mode with the driving mechanisms of the blurring correction unit forced into operative states and a blurring correction-added soft focus photographing mode.

If it is assumed that the shutter button is depressed while the photographic mode switch 10 is set at the blurring correction photographing mode, an image is picked up under the operation of the blurring correction unit. That is, if the shutter button is depressed and the shutter switch 9 is turned on, then the shutter is driven. While the shutter is opened, the CPU 1 controls the drivers 11 and 21 based on the detection output of the displacement sensor 2. The driving mechanisms 11 and 22 independently move the CCD 8 in the X and Y directions, respectively. The movements of the CCD 8 in the X and Y directions are movements in directions in which the X and Y direction components of the blurring are canceled each other. The movements allow a clear subject image without the influence of the blurring to be formed on the surface of the CCD 8.

If it is assumed that the shutter button is depressed while the photographic mode switch 10 is set at the soft focus photographing mode, the blurring correction unit does not operate. The CPU 1 instead forcedly controls the drivers 11 and 12 and the drivers 11 and 12 drive the driving mechanisms 11 and 22 to independently move the CCD 8 in the X and Y directions, respectively. The movements of the CCD 8 are forced movements irrelevant to the detection output of the displacement sensor 2. The movements are a kind of slight movements in a range in which a subject image detected by the CCD 8 is not largely disturbed. By thus utilizing the driving mechanisms 12 and 22 of the blurring correction unit and forcedly moving the CCD 8 by the driving mechanism 12 and 22, the image formed by an image pickup signal from the CCD 8 becomes an image having a soft focus effect.

Figure 2:
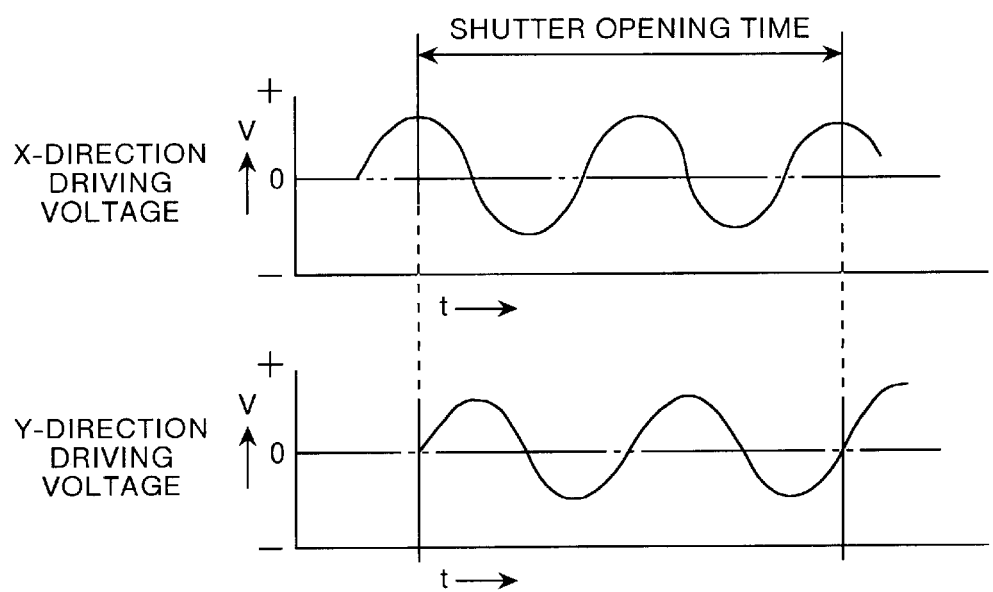
FIG. 2 is a timing chart which shows an example of driving waveforms available in the present invention.
Figure 3:
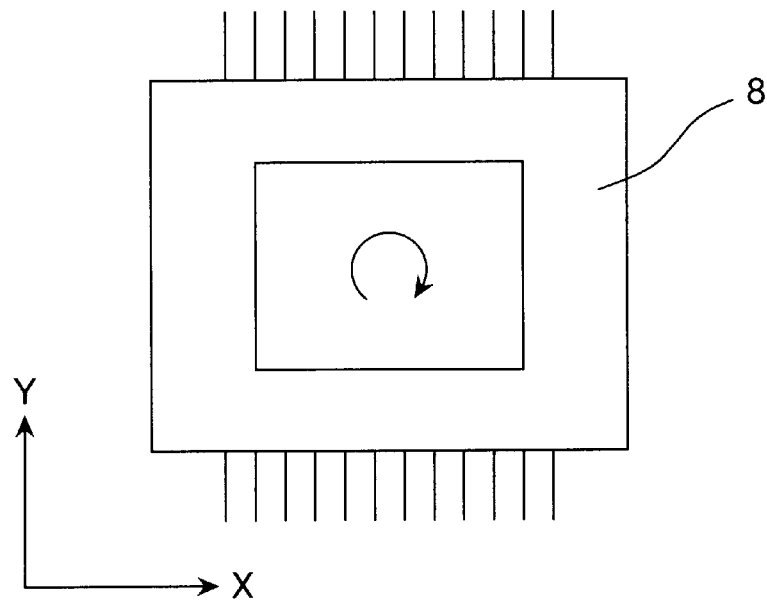
FIG. 3 is a front view which shows an example of an image pickup device driven by the driving waveforms shown in FIG. 2.

If the wave forms of voltages applied to the two drivers 11 and 22 are changed when the CCD 8 is forced to be moved in the two directions, it is possible to change the movement pattern of the CCD 8. FIG. 2 shows an example of the waveforms of voltages applied to the two drivers 11 and 21, respectively. In FIG. 2, both the waveform of the X-direction driving voltage applied to the driver 11 and that of the Y-direction driving voltage applied to the driver 21 while the shutter is opened are of sine waves or cosine waves and shifted from each other in phase by 90 degrees. The X-direction driving wave and the Y-direction driving wave are almost the same in amplitude. If the driving mechanisms 12 and 22 are driven by the two driving waves, respectively, the CCD 8 is moved to form a slightly, generally circular locus while holding a predetermined position and keeping the light receiving surface of the CCD 8 unchanged as shown in FIG. 3.

The amplitude of the X-direction driving wave and that of the Y-direction driving wave can be arbitrarily changed. If the amplitudes of both the X-direction driving wave and the Y-direction driving wave are increased, the movement range of the CCD 8 increases. If the amplitudes of both the X-direction driving wave and the Y-direction driving wave are decreased, the movement range of the CCD 8 decreases. Alternatively, by setting the amplitude of the X-direction driving wave different from the amplitude of the Y-direction driving wave, the CCD 8 can be moved to form an elliptic locus.

Figure 4:
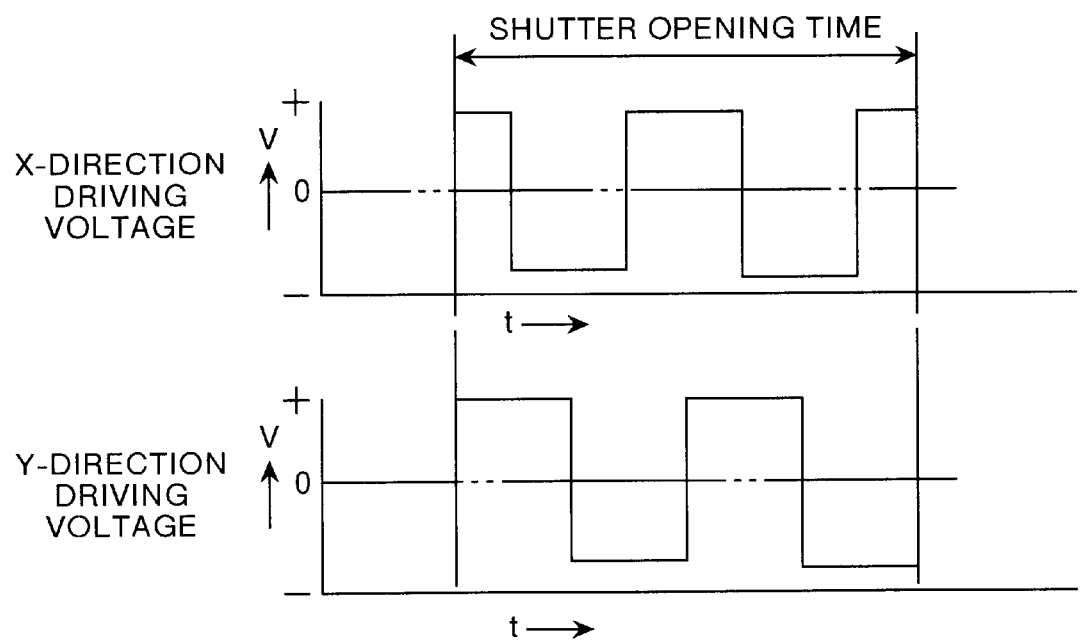
FIG. 4 is a timing chart which shows another example of driving waveforms available in the present invention.
Figure 5:
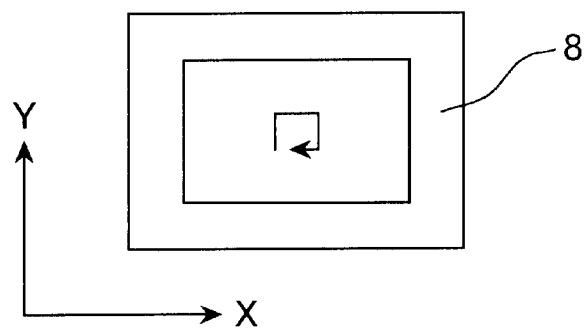
FIG. 5 is front view which shows an example of an image pickup device driven by the driving waveforms shown in FIG. 4.

FIG. 4 shows another example of the waveforms of driving voltages applied to the drivers 11 and 21, respectively. The waveform of the X-direction driving voltage applied to the driver 11 and that of a Y-direction driving voltage applied to the driver 21 while the shutter is opened are of rectangular waves and shifted from each other in phase by 90 degrees. The X-direction driving wave and the Y-direction driving wave are almost the same in amplitude. As shown in FIG. 4, the X-direction driving wave and the Y-direction driving wave are changed in the order of "rise of X-direction driving wave"→"rise of Y-direction driving wave"→"fall of X-direction driving wave"→"fall of Y-direction driving wave" at predetermined time intervals. The driving mechanisms 12 and 22, therefore, move the CCD 8 in accordance with the respective driving waves. As a result, the CCD 8 is moved to form a slight, rectangular locus while holding a predetermined position and keeping the light receiving surface unchanged as shown in FIG. 5. A subject image formed on the light receiving surface of the CCD 8 becomes an image having a soft focus effect.

In the example shown in FIG. 4, the X-direction driving waveform and the Y-direction driving waveform are alternately changing periodic waveforms and the CCD 8 is moved to form a rectangular locus, accordingly, as described above. Also in this case, the amplitude of the X-direction driving wave and that of the Y-direction may be adjusted. The amplitudes of the X-direction driving wave and the Y-direction driving wave may be adjusted simultaneously so as to be equal to each other or may be adjusted independently.

Figure 6:
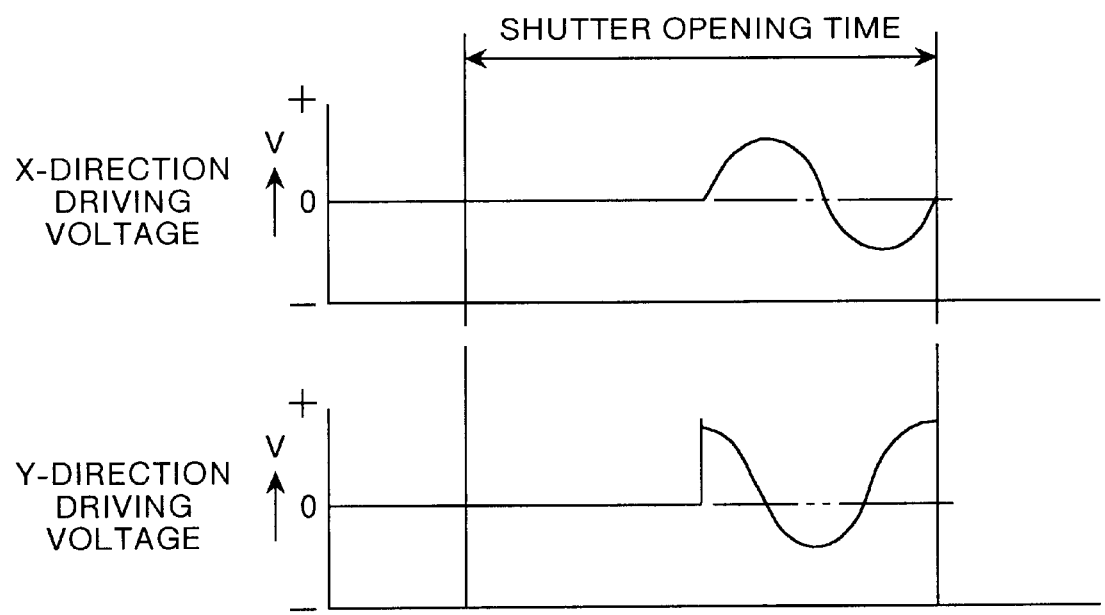
FIG. 6 is a timing chart which shows still another example of driving waveforms available in the present invention.

FIG. 6 shows still another example of the waveforms of an X-direction driving waveform and a Y-direction driving waveform, respectively. The driving waveforms shown in FIG. 6 are combined the operative state and the inoperative state of each driving mechanism. That is, in the example shown in FIG. 6, the driving waveforms are of sine waves or cosine waves as in the case of FIG. 2. However, differently from those shown in FIG. 2, the amplitudes of the both driving waves are set zero and the driving mechanisms 12 and 22 are set in inoperative states in part of predetermined shutter opening time, i.e., almost in the first half of the shutter opening time in the example of FIG. 6 and the both driving waveforms are set to be of sine waves or cosine waves almost in the second half of the shutter opening time in the example of FIG. 6. The driving mechanisms 12 and 22 drive and move the CCD 8 in accordance with the respective driving waveforms.

If the operative state and the inoperative state of each driving mechanism are combined while the shutter is opened as shown in the example of FIG. 6, a subject image is clearly picked up while the driving mechanisms are set in inoperative states and a subject image having a soft focus effect is picked up while the driving mechanisms are set in operative states. It is, therefore, possible to advantageously obtain a subject image having a soft focus effect with the center of the image clearly shown. The time ratio of the operative state of each driving mechanism to the inoperative state thereof while the shutter is opened may be set arbitrarily according to the concept of the designer of the camera or may be adjusted arbitrarily by the user of the camera. Also in this case, the waveforms of the driving waves may be rectangular.

An operation member which the photographer can arbitrarily operate may be provided at the camera. The amplitude levels of the driving waves or the time levels of the operative states and the inoperative states of the driving mechanisms while the shutter is opened may be selected in interlock with this operation member. If so, by the photographer's operation of the operation member, it is possible to arbitrarily select a soft focus level.

The amplitude levels of the driving waves or the time levels of the operative states and inoperative stats of the driving mechanisms while the shutter is opened may be automatically set by the camera in accordance with various photographic conditions without the operation of the photographer. For example, it is possible to set the amplitude levels of the driving waves or the time levels of the operative states and the inoperative states of the driving mechanisms in interlock with a change in the focal distance of the photographic lens. In that case, focal distance information on the photographic lens can be obtained from the position signal of the zoom ring 6 shown in FIG. 1. In telescopic photographing, since a focal depth is small and the camera is susceptible to blurring, the amplitude levels of the driving waves are set low or the driving mechanism forced operation time is set short to thereby lower the soft focus level. Conversely, as the angle of the lens is wider, the soft focus level is set higher.

The amplitude levels of the driving waves or the time levels of the operative states and the inoperative stats of the driving mechanisms may be set in interlock with a change in a photographic distance. In this case, photographic distance information can be obtained from the position signal of the distance ring 5 shown in FIG. 1. At a fixed focal distance, as the photographic distance is longer, the focal depth is larger and a clear image can be obtained more easily. Therefore, the amplitude levels of the driving waves are set lower or the driving mechanism forced operation time is set shorter to thereby set the soft focus level higher. Conversely, as the photographic distance is shorter, the soft focus level is set lower.

The amplitude levels of the driving waves or the time levels of the operative states and the inoperative states of the driving mechanisms may be set in interlock with a change in the aperture of the diaphragm of the photographic lens. In this case, diaphragm aperture information can be obtained from the position signal of the diaphragm ring 7 shown in FIG. 1. Since a focal depth is smaller and a clear image is obtained less easily as the diaphragm aperture is lower (a value F is lower), the soft focus level is set lower. Conversely, as the aperture of the diaphragm is lower, the soft focus level is set higher.

The amplitude levels of the driving waves or the time levels of the operative states and the inoperative states of the driving mechanisms may be set in interlock with an automatic exposure control state. In this case, automatic exposure control information can be obtained from the automatic exposure unit 4 shown in FIG. 1. If the luminance of the subject is low, shutter speed is slow or the aperture of the diaphragm becomes high and a clear image can be obtained less easily. The soft focus level is, therefore, set lower. Conversely, as the luminance of the subject is higher, the soft focus level is set higher.

In the embodiments explained thus far, each of the X-direction driving wave and the Y-direction driving wave has a frequency expressed by a natural number having at least one cycle while the shutter is opened.

However, the X-direction driving waveform and the Y-direction driving waveform are not necessarily alternately changing periodic waveforms but may be independently, asynchronously changing waveforms at respective arbitrary frequencies and respective arbitrary amplitudes.

If the blurring correction-added soft focus photographing mode is selected by the photographic mode switch 10 shown in FIG. 1, it is possible to combine the blurring prevention photographing by the operation of the blurring correction unit and the soft focus photographing by forcedly actuating the blurring correction unit.

As already explained above, the photographic mode switch 10 constitutes a selection unit capable of selecting one of the normal photographing mode with the blurring correction unit set in an inoperative state, the blurring correction photographing mode with the blurring correction unit set in an operative state, the soft focus photographing mode with the driving mechanisms of the blurring correction unit forced into operative states and the blurring correction-added soft focus photographing mode.

The driving target of the driving mechanisms in the soft focus photographing is not limited to an image pickup device such as the CCD but depends on the system of the blurring correction unit. For example, if the blurring correction unit drives a prism provided as an optical component in an optical system, the driving mechanisms may forcedly move this prism in the soft focus photographing mode. If the blurring correction unit drives an optical component, other than the prism, constituting the optical system, the driving mechanisms may forcedly move this optical component in the soft focus photographing mode.

The present invention is not limited to the digital camera but is applicable to a silver salt photographic camera, as well.

According to the first aspect of the present invention, by utilizing the camera with the blurring correction unit and forcedly actuating the driving mechanisms of the blurring correction unit by the selection of a photographer, soft focus is attained. It is, therefore, possible to obtain a soft focus image without providing a dedicated mechanism or a dedicated optical component which obtains the soft focus effect and to obtain a soft focus image without carrying out a complicated image processing.

According to the second aspect of the present invention, the optical component or the image pickup device makes a circular motion. According to third aspect of the present invention, the optical component or the image pickup device makes a motion to form a rectangular locus. It is thereby possible to obtain a soft focus image.

According to the fourth aspect of the present invention, a portion which validates a soft focus effect and a portion which invalidates the soft focus effect are provided while the shutter is opened. It is, therefore, possible to form a subject image which gives a soft impression with a clear subject image shown at a center.

According to the sixth aspect of the present invention, by adjusting the amplitudes of the driving waves, it is possible to adjust a soft focus level.

According to the seventh aspect of the present invention, a portion which validates a soft focus effect and a portion which invalidates the soft focus effect can be adjusted while the shutter is opened. It is, therefore, possible to obtain an image more agreed with the intention of the photographer by arbitrarily adjusting the ratio of a clear subject image formed at a center to a subject image which gives a soft impression.

According to the eighth aspect of the present invention, it is possible to select a soft focus level by operating the operation member and to obtain an image agreed with the intention of the photographer.

According to the ninth aspect of the present invention, it is possible to take a photograph with an appropriate soft focus level in accordance with a change in the focal length of the photographic lens.

According to the tenth aspect of the present of the present invention, it is possible to take a photograph with an appropriate soft focus level in accordance with a change in a photographic distance.

According to the eleventh aspect of the present invention, it is possible to take a photograph with an appropriate soft focus level in accordance with a change in the aperture of the diaphragm of the photographic lens.

According to the twelfth aspect of the present invention, it is possible to take a photograph with an appropriate soft focus level in accordance with an automatic exposure control state.

According to the thirteenth aspect of the present invention, by combining blurring prevention photographing and soft focus photographing, it is possible to take a photograph while a clear subject image and a subject image having a soft focus effect centered around the clear subject image are superposed on each other and to obtain an image having a unique effect.

According to the fourteenth aspect of the present invention, by taking a photograph by arbitrarily selecting various photographic modes, it is possible to obtain various images giving different expressions.

The present document incorporates by reference the entire contents of Japanese priority document, 2001-008848 filed in Japan on Jan. 17, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A camera capable of soft focus photographing with a blurring correction unit, the blurring correction unit comprising:
   a displacement sensor attached to the camera and capable of measuring a displacement of the camera; and
   driving mechanisms capable of independently moving an optical component or a photographic member including a lens in two directions, respectively, said driving mechanisms actuated according to a detection signal of said displacement sensor, the blurring correction unit capable of correcting a disturbance in a picked-up image due to blurring, wherein
      by forcedly actuating said driving mechanisms of the blurring correction unit by selection of a photographer, soft focus is attained,
      wherein the driving mechanisms allow the optical component or the photographic member to make a circular motion by independently moving the optical component or the photographic member in the two orthogonal directions, respectively, in accordance with driving waves each in a form of one of a sine wave and a cosine wave while a shutter is opened,
      wherein amplitude levels of the driving waves or operation time levels and inoperative time levels of the driving mechanisms are set in interlock with a change in a focal length of a photographic lens.

2. The camera capable of soft focus photographing according to claim 1, wherein
   while the shutter is opened, each of the driving mechanisms has a combination of an operation state and an inoperative state.

3. The camera capable of soft focus photographing according to claim 1, wherein
   each of the driving waves has a frequency of a natural number having at least one cycle.

4. The camera capable of soft focus photographing according to claim 1, wherein
   amplitudes of the driving waves are adjustable.

5. The camera capable of soft focus photographing according to claim 4, wherein
   amplitude levels of the driving waves or operation time levels and inoperative time levels of the driving mechanisms are set in interlock with operation of an operation member provided at the camera, to thereby allow the photographer to select a soft focus level.

6. The camera capable of soft focus photographing according to claim 1, wherein
   amplitude levels of the driving waves or operation time levels and inoperative time levels of the driving mechanisms are set in interlock with an automatic exposure control state.

7. The camera capable of soft focus photographing according to claim 1, wherein
   the driving mechanisms independently move the optical component or the photographic member in two orthogonal directions, respectively, according to driving waves each in a form of one of a sine wave and a cosine wave while a shutter is opened;
   said driving waves in the two directions are alternately changing periodic waves; and
   said driving mechanisms move the optical component or the photographic member by the periodic waves respectively.

8. The camera capable of soft focus photographing according to claim 1, wherein
   while the shutter is opened, each of the driving mechanisms has a combination of an operation state and an inoperative state.

9. The camera capable of soft focus photographing according to claim 8, wherein
   operative time and inoperative time of each of the driving mechanisms while the shutter is opened are adjustable.

10. The camera capable of soft focus photographing according to claim 9, wherein
    amplitude levels of the driving waves or operation time levels and inoperative time levels of the driving mechanisms are set in interlock with operation of an operation member provided at the camera, to thereby allow the photographer to select a soft focus level.

11. The camera capable of soft focus photographing according to claim 9, wherein
    amplitude levels of the driving waves or operation time levels and inoperative time levels of the driving mechanisms are set in interlock with a change in a focal length of a photographic lens.

12. The camera capable of soft focus photographing according to claim 9, wherein
    amplitude levels of the driving waves or operation time levels and inoperative time levels of the driving mechanisms are set in interlock with a change in a photographic distance.

13. The camera capable of soft focus photographing according to claim 9, wherein
    amplitude levels of the driving waves or operation time levels and inoperative time levels of the driving mechanisms are set in interlock with a change in aperture of a diaphragm of a photographic lens.

14. The camera capable of soft focus photographing according to claim 9, wherein
    amplitude levels of the driving waves or operation time levels and inoperative time levels of the driving mechanisms are set in interlock with an automatic exposure control state.

15. The camera capable of soft focus photographing according to claim 1, wherein
    blurring prevention photographing conducted by operation of the blurring correction unit and soft focus photographing conducted by forcedly actuating the blurring correction unit can be combined.

16. The camera capable of soft focus photographing according to claim 1, comprising:

a selection unit capable of selecting one of normal photographing with the blurring correction unit set in an inoperative state, blurring correction photographing with the blurring correction unit set in an operative state, soft focus photographing by forcedly operating the driving mechanisms of the blurring correction unit and blurring correction-added soft focus photographing.

17. A camera capable of soft focus photographing with a blurring correction unit, the blurring correction unit comprising:

a displacement sensor attached to the camera and capable of measuring a displacement of the camera; and driving mechanisms capable of independently moving an optical component or a photographic member including a lens in two directions, respectively, said driving mechanisms actuated according to a detection signal of said displacement sensor, the blurring correction unit capable of correcting a disturbance in a picked-up image due to blurring, wherein by forcedly actuating said driving mechanisms of the blurring correction unit by selection of a photographer, soft focus is attained, wherein amplitude levels of the driving waves or operation time levels and inoperative time levels of the driving mechanisms are set in interlock with a change in a photographic distance.

18. The camera capable of soft focus photographing according to claim 17, wherein while the shutter is opened each of the driving mechanisms has a combination of an operation state and an inoperative state.

19. The camera capable of soft focus photographing according to claim 17, wherein each of the driving waves has a frequency of a natural number having at least one cycle.

20. The camera capable of soft focus photographing according to claim 17, wherein amplitudes of the driving waves are adjustable.

21. The camera capable of soft focus photographing according to claim 20, wherein amplitude levels of the driving waves or operation time levels and inoperative time levels of the driving mechanisms are set in interlock with operation of an operation member provided at the camera, to thereby allow the photographer to select a soft focus level.

22. The camera capable of soft focus photographing according to claim 17, wherein amplitude levels of the driving waves or operation time levels and inoperative time levels of the driving mechanisms are set in interlock with an automatic exposure control state.

23. The camera capable of soft focus photographing according to claim 17, wherein the driving mechanisms independently move the optical component or the photographic member in two orthogonal directions, respectively, according to driving waves each in a form of one of a sine wave and a cosine wave while a shutter is opened;

said driving waves in the two directions are alternately changing periodic waves; and said driving mechanisms move the optical component or the photographic member by the periodic waves respectively.

24. The camera capable of soft focus photographing according to claim 17, wherein while the shutter is opened, each of the driving mechanisms has a combination of an operation state and an inoperative state.

25. The camera capable of soft focus photographing according to claim 17, wherein operative time and inoperative time of each of the driving mechanisms while the shutter is opened are adjustable.

26. The camera capable of soft focus photographing according to claim 25, wherein amplitude levels of the driving waves or operation time levels and inoperative time levels of the driving mechanisms are set in interlock with operation of an operation member provided at the camera, to thereby allow the photographer to select a soft focus level.

27. The camera capable of soft focus photographing according to claim 25, wherein amplitude levels of the driving waves or operation time levels and inoperative time levels of the driving mechanisms are set in interlock with a change in a focal length of a photographic lens.

28. The camera capable of soft focus photographing according to claim 25, wherein amplitude levels of the driving waves or operation time levels and inoperative time levels of the driving mechanisms are set in interlock with a change in a photographic distance.

29. The camera capable of soft focus photographing according to claim 25, wherein amplitude levels of the driving waves or operation time levels and inoperative time levels of the driving mechanisms are set in interlock with a change in aperture of a diaphragm of a photographic lens.

30. The camera capable of soft focus photographing according to claim 25, wherein amplitude levels of the driving waves or operation time levels and inoperative time levels of the driving mechanisms are set in interlock with an automatic exposure control state.

31. The camera capable of soft focus photographing according to claim 17, wherein blurring prevention photographing conducted by operation of the blurring correction unit and soft focus photographing conducted by forcedly actuating the blurring correction unit can be combined.

32. The camera capable of soft focus photographing according to claim 17, comprising:

a selection unit capable of selecting one of normal photographing with the blurring correction unit set in an inoperative state, blurring correction photographing with the blurring correction unit set in an operative state, soft focus photographing by forcedly operating the driving mechanisms of the blurring correction unit and blurring correction-added soft focus photographing.

33. A camera capable of soft focus photographing with a blurring correction unit, the blurring correction unit comprising:

a displacement sensor attached to the camera and capable of measuring a displacement of the camera; and driving mechanisms capable of independently moving an optical component or a photographic member including a lens in two directions, respectively, said driving mechanisms actuated according to a detection signal of said displacement sensor, the blurring correction unit capable of correcting a disturbance in a picked-up image due to blurring, wherein by forcedly actuating said driving mechanisms of the blurring correction unit by selection of a photographer, soft focus is attained, wherein amplitude levels of the driving waves or operation time levels and inoperative time levels of the driving mechanisms are set in interlock with a change in aperture of a diaphragm of a photographic lens.

34. The camera capable of soft focus photographing according to claim 33, wherein while the shutter is opened, each of the driving mechanisms has a combination of an operation state and an inoperative state.

35. The camera capable of soft focus photographing according to claim 33, wherein each of the driving waves has a frequency of a natural number having at least one cycle.

36. The camera capable of soft focus photographing according to claim 33, wherein amplitudes of the driving waves are adjustable.

37. The camera capable of soft focus photographing according to claim 36, wherein amplitude levels of the driving waves or operation time levels and inoperative time levels of the driving mechanisms are set in interlock with operation of an operation member provided at the camera, to thereby allow the photographer to select a soft focus level.

38. The camera capable of soft focus photographing according to claim 33, wherein amplitude levels of the driving waves or operation time levels and inoperative time levels of the driving mechanisms are set in interlock with an automatic exposure control state.

39. The camera capable of soft focus photographing according to claim 33, wherein the driving mechanisms independently move the optical component or the photographic member in two orthogonal directions, respectively, according to driving waves each in a form of one of a sine wave and a cosine wave while a shutter is opened;

said driving waves in the two directions are alternately changing periodic waves; and said driving mechanisms move the optical component or the photographic member by the periodic waves respectively.

40. The camera capable of soft focus photographing according to claim 33, wherein while the shutter is opened, each of the driving mechanisms has a combination of an operation state and an inoperative state.

41. The camera capable of soft focus photographing according to claim 33, wherein operative time and inoperative time of each of the driving mechanisms while the shutter is opened are adjustable.

42. The camera capable of soft focus photographing according to claim 41, wherein amplitude levels of the driving waves or operation time levels and inoperative time levels of the driving mechanisms are set in interlock with operation of an operation member provided at the camera, to thereby allow the photographer to select a soft focus level.

43. The camera capable of soft focus photographing according to claim 41, wherein amplitude levels of the driving waves or operation time levels and inoperative time levels of the driving mechanisms are set in interlock with a change in a focal length of a photographic lens.

44. The camera capable of soft focus photographing according to claim 41, wherein amplitude levels of the driving waves or operation time levels and inoperative time levels of the driving mechanisms are set in interlock with a change in a photographic distance.

45. The camera capable of soft focus photographing according to claim 41, wherein amplitude levels of the driving waves or operation time levels and inoperative time levels of the driving mechanisms are set in interlock with a change in aperture of a diaphragm of a photographic lens.

46. The camera capable of soft focus photographing according to claim 41, wherein amplitude levels of the driving waves or operation time levels and inoperative time levels of the driving mechanisms are set in interlock with an automatic exposure control state.

47. The camera capable of soft focus photographing according to claim 33, wherein blurring prevention photographing conducted by operation of the blurring correction unit and soft focus photographing conducted by forcedly actuating the blurring correction unit can be combined.

48. The camera capable of soft focus photographing according to claim 33, comprising:

a selection unit capable of selecting one of normal photographing with the blurring correction unit set in an inoperative state, blurring correction photographing with the blurring correction unit set in an operative state, soft focus photographing by forcedly operating the driving mechanisms of the blurring correction unit and blurring correction-added soft focus photographing.

* * * * *